(12) United States Patent
Brown et al.

(10) Patent No.: US 8,550,692 B1
(45) Date of Patent: Oct. 8, 2013

(54) FOOD MIXER AND ATTACHMENT STORAGE APPARATUS

(76) Inventors: Brian Brown, Chicago, IL (US); Winslow O. Young, Chicago, IL (US)

( * ) Notice: Subject to any disclaimer, the term of this patent is extended or adjusted under 35 U.S.C. 154(b) by 844 days.

(21) Appl. No.: 12/753,192

(22) Filed: Apr. 2, 2010

(51) Int. Cl.
*B01F 15/00* (2006.01)

(52) U.S. Cl.
USPC .......................................................... 366/129

(58) Field of Classification Search
USPC ........... 366/129, 342, 208, 279, 348; 206/320
See application file for complete search history.

(56) References Cited

U.S. PATENT DOCUMENTS

| | | | |
|---|---|---|---|
| 3,187,366 A | 6/1965 | Fant | |
| 3,224,743 A | 12/1965 | Freedman | |
| 3,758,183 A * | 9/1973 | Steinkamp et al. | 312/292 |
| D278,506 S | 4/1985 | Kafka | |
| 4,739,885 A | 4/1988 | Noland et al. | |
| D345,888 S | 4/1994 | Joss et al. | |
| D361,240 S | 8/1995 | Hanig | |
| D511,930 S | 11/2005 | Wong | |
| D536,570 S | 2/2007 | Lo | |
| 2002/0184983 A1 * | 12/2002 | Lau et al. | 83/77 |
| 2003/0165366 A1 | 9/2003 | Bennage et al. | |
| 2004/0129809 A1 * | 7/2004 | Siano et al. | 366/129 |
| 2006/0162508 A1 | 7/2006 | Liu | |
| 2011/0162986 A1 * | 7/2011 | Garman et al. | 366/129 |

* cited by examiner

*Primary Examiner* — Tony G Soohoo
*Assistant Examiner* — Anshu Bhatia

(57) ABSTRACT

A food mixer and attachment storage apparatus includes a food mixer with a housing defined by a perimeter wall. The perimeter wall includes a top wall, a bottom wall and peripheral wall attached to and extending between the top and bottom walls. A motor is mounted within the housing. A pair of attachment couplers is mounted in the bottom wall and mechanically coupled to the motor. A power cord is electrically coupled to the motor. Each of a pair of mixing attachments includes a male end extendable into and removably couplable to one of the attachment couplers. A compartment is positioned in the housing and extends into the perimeter wall. The compartment has a size configured to received the mixing attachments.

4 Claims, 5 Drawing Sheets

FOOD MIXER AND ATTACHMENT STORAGE APPARATUS

BACKGROUND OF THE DISCLOSURE

Field of the Disclosure

The disclosure relates to food mixer and attachment storage combination devices and more particularly pertains to a new food mixer and attachment storage combination device for allowing the storage of mixer attachments within the housing of the food mixer.

SUMMARY OF THE DISCLOSURE

An embodiment of the disclosure meets the needs presented above by generally comprising a food mixer that includes a housing defined by a perimeter wall. The perimeter wall includes a top wall, a bottom wall and peripheral wall attached to and extending between the top and bottom walls. A motor is mounted within the housing. A pair of attachment couplers is mounted in the bottom wall and mechanically coupled to the motor. A power cord is electrically coupled to the motor. Each of a pair of mixing attachments includes a male end extendable into and removably couplable to one of the attachment couplers. A compartment is positioned in the housing and extends into the perimeter wall. The compartment has a size configured to received the mixing attachments.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
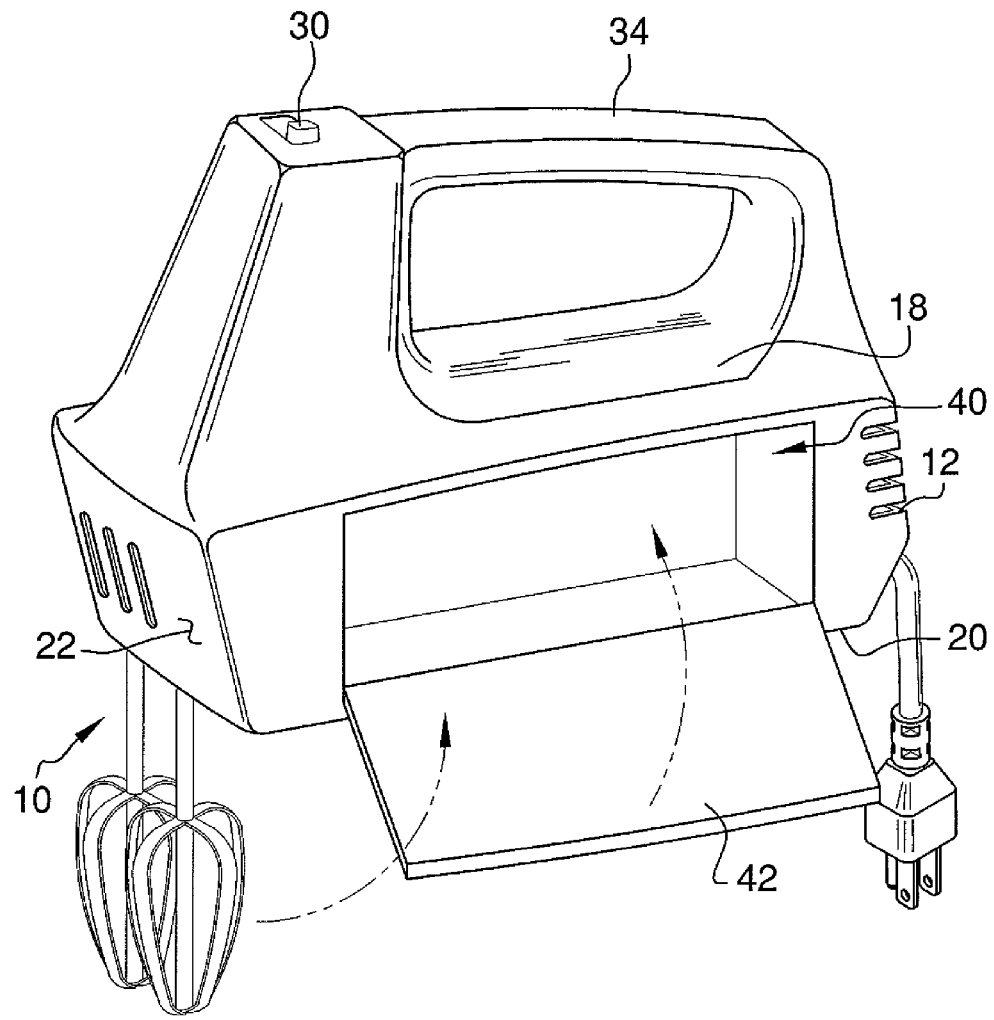
FIG. 1 is a side perspective view of a food mixer and attachment storage apparatus according to an embodiment of the disclosure.

With reference now to the drawings, and in particular to FIGS. 1 through 5 thereof, a new food mixer and attachment storage combination device embodying the principles and concepts of an embodiment of the disclosure and generally designated by the reference numeral 10 will be described.

As best illustrated in FIGS. 1 through 5, the food mixer and attachment storage apparatus 10 generally comprises generally conventional food mixer 12 that includes a housing 14 defined by a perimeter wall 16. The perimeter wall 16 includes a top wall 18, a bottom wall 20 and peripheral wall 22 attached to and extending between the top 18 and bottom 20 walls. A motor 24 is mounted within the housing 14. A pair of attachment couplers 26 is mounted in the bottom wall 20 that is mechanically coupled to the motor 24. A power cord 28 is electrically coupled to the motor 24 and an actuator 30, electrically coupled to the motor 24, is used to turn on the motor 24 and vary its speed. The above being conventional to hand held food mixers. The power cord 28 is retractable into the housing 14 using a conventional cord retracting mechanism 32. A handle 34 is attached to the top wall 18.

A pair of mixing attachments 36 is provided. Each of the mixing attachments 36 includes a male end 38 that is extendable into and removably couplable to one of the attachment couplers 26.

Figure 2:
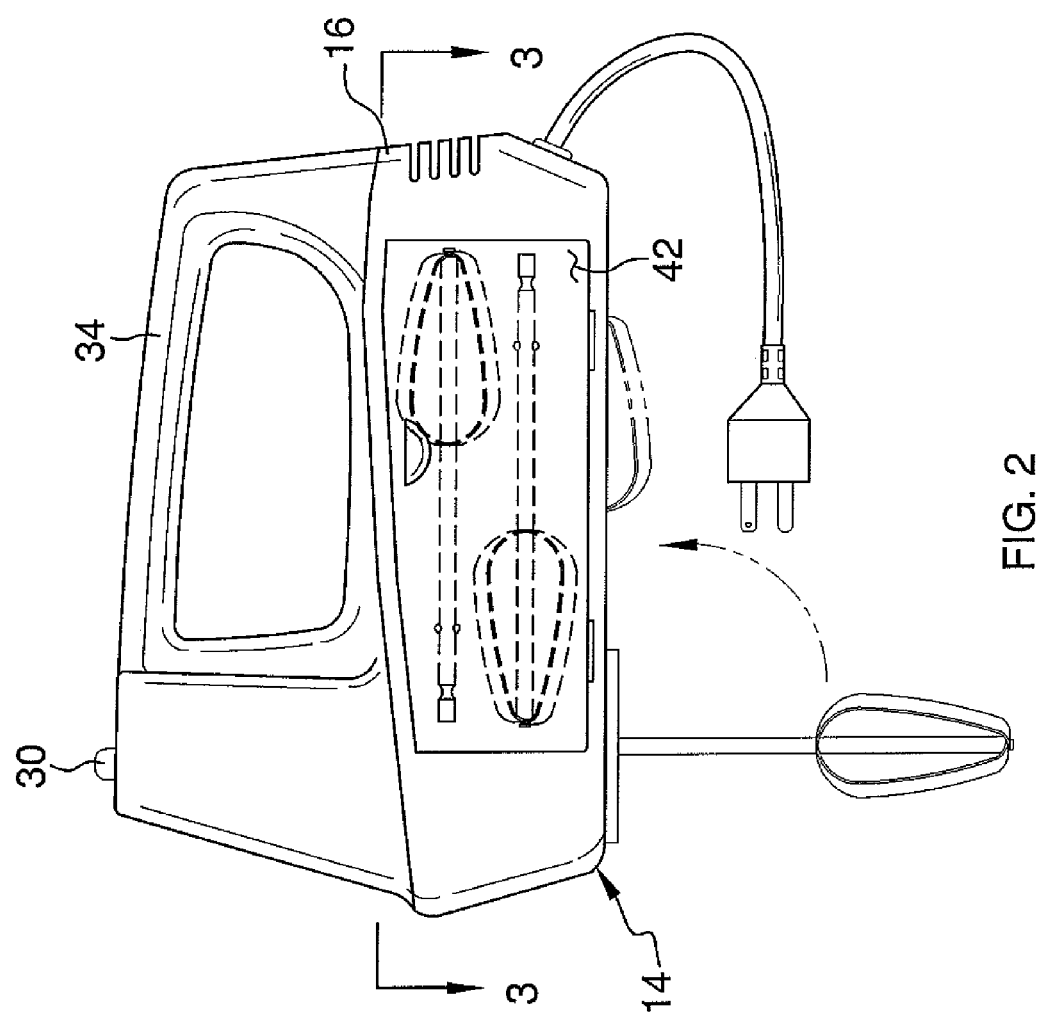
FIG. 2 is a side view of an embodiment of the disclosure.
Figure 3:
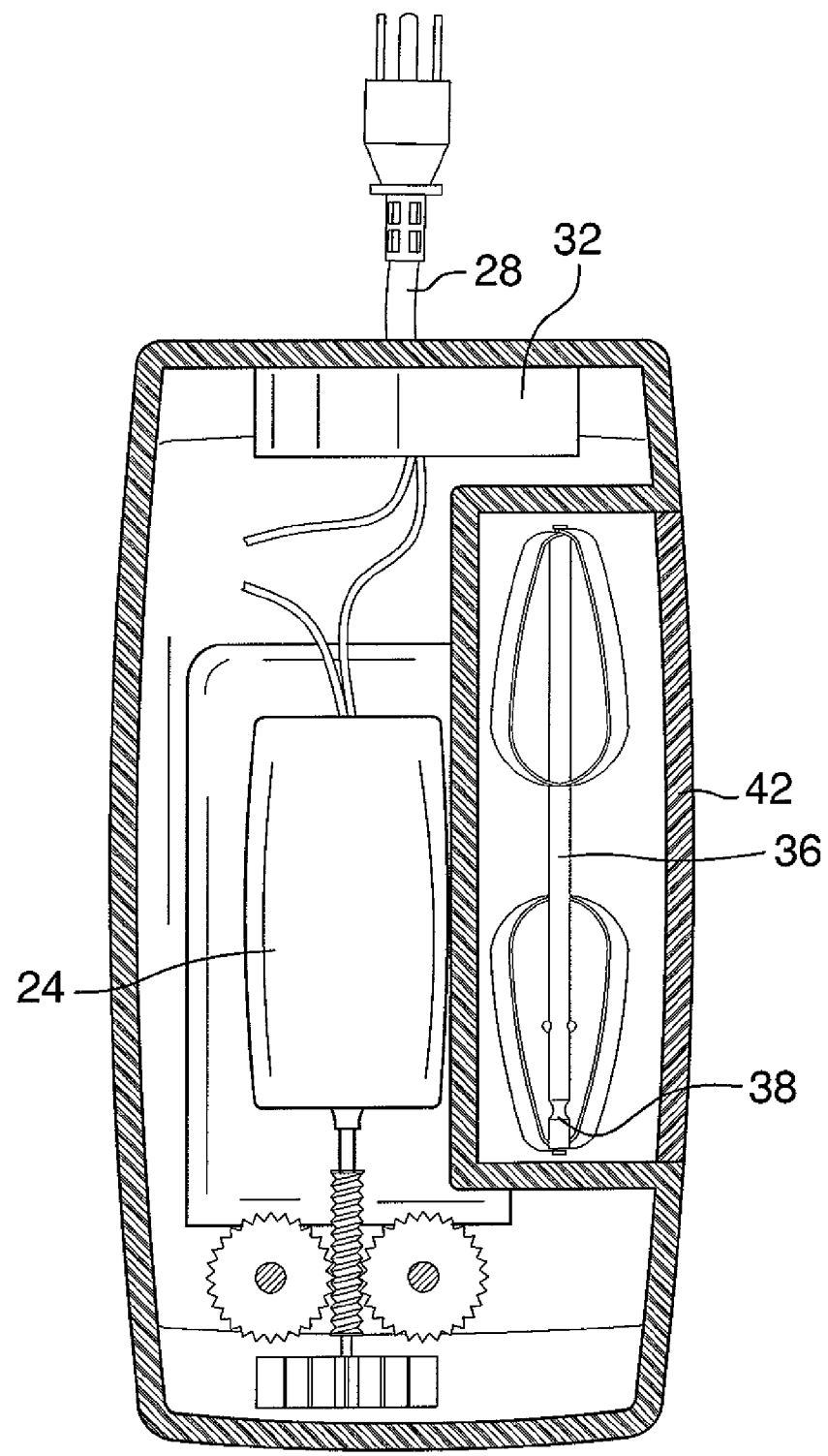
FIG. 3 is a cross-sectional view of an embodiment of the disclosure taken along line 3-3 of FIG. 2.
Figure 4:
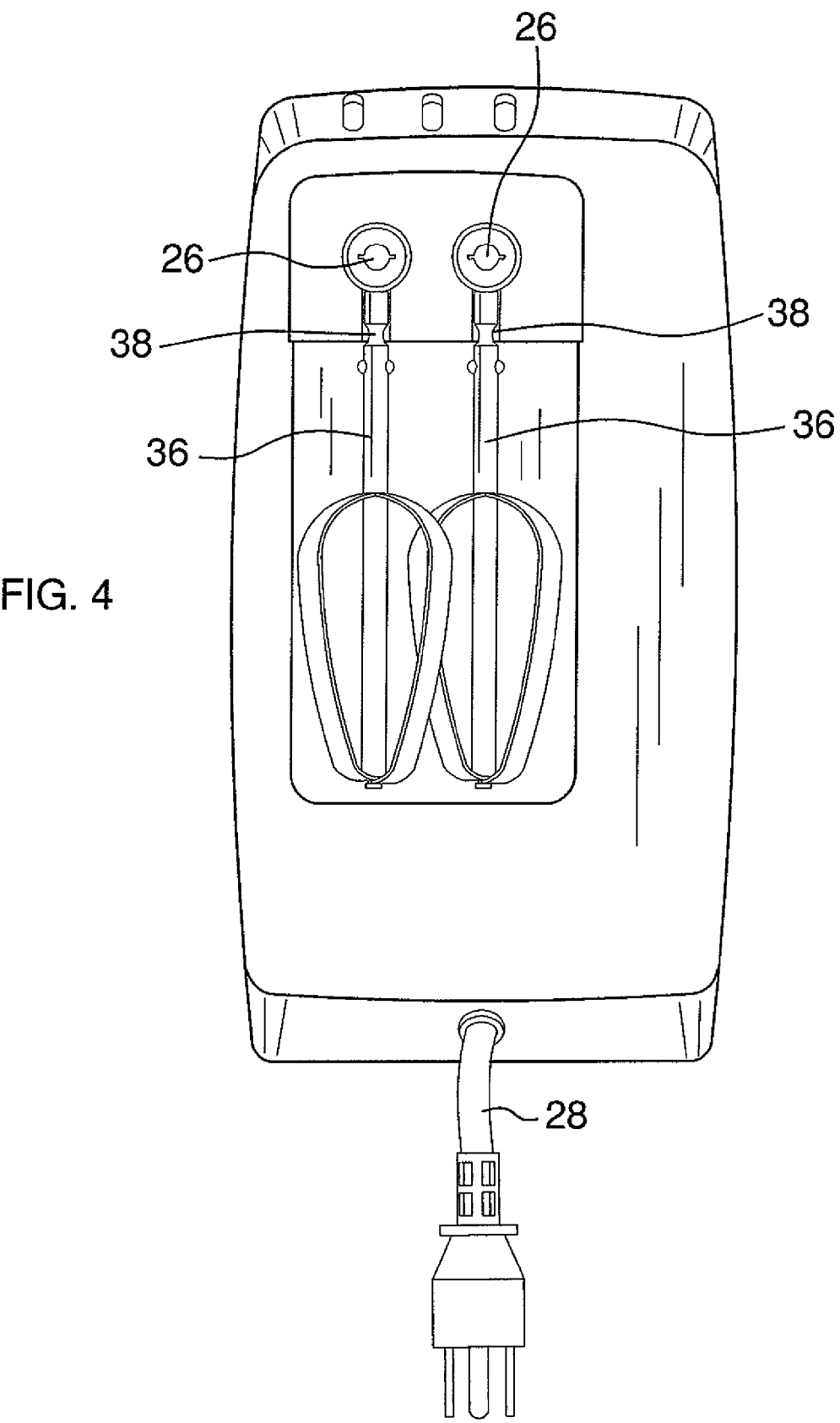
FIG. 4 is a bottom view of an embodiment of the disclosure.
Figure 5:
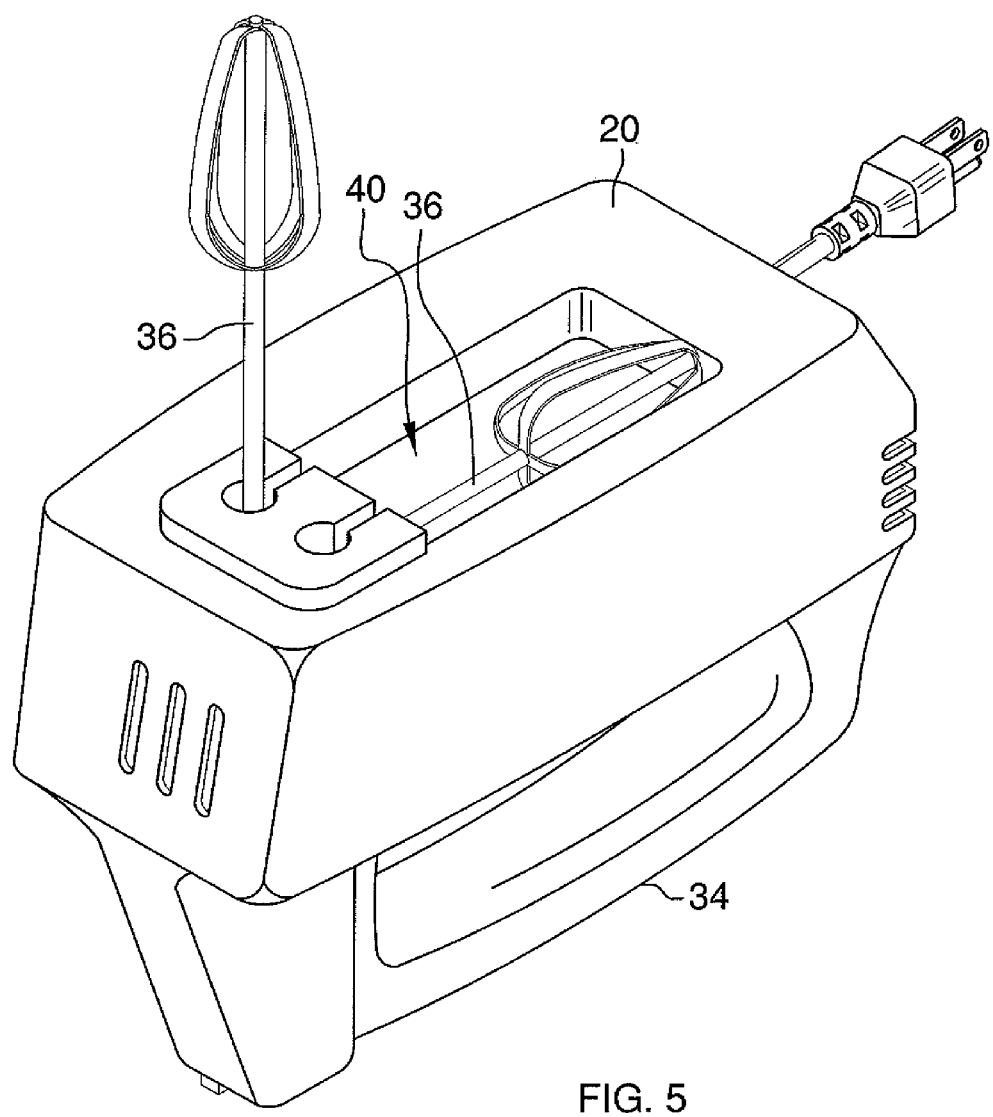
FIG. 5 is a bottom perspective view of an embodiment of the disclosure.

A compartment 40 is positioned in the housing 14 and extends into the perimeter wall 22. The compartment 40 has a size configured to received the mixing attachments 36. A door 42 is hingedly coupled to the housing 14. The door 42 is selectively positioned in a closed position closing the compartment 40. As shown in FIGS. 1-3, the compartment may 40 extend into the peripheral wall 22 between the top 18 and bottom 20 walls. Alternatively, FIGS. 4 and 5 show a compartment 40 that extends upwardly into the bottom wall 20. If the compartment 40 is extended into the bottom wall 20, the mixing attachments 36 may be pivotally coupled to the housing 14 to allow them to be pivoted from an engaged position to a stored position. FIG. 5 shows one attachment 36 in a stored position and an engaged position. If the attachments 36 are pivotally coupled to the housing 14, the door 42 may not be used.

In use, the food mixer 12 is used in a conventional manner, however, when the food mixer is not being used, the attachments 36 are more easily stored and not lost by the placing of them into the compartment 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A food mixer and attachment storage apparatus, said apparatus comprising:
   a food mixer including a housing being defined by a perimeter wall, said perimeter wall including a top wall, a bottom wall and peripheral wall being attached to and extending between said top and bottom walls, a motor being mounted within said housing, a pair of attachment couplers being mounted in said bottom wall and being mechanically coupled to said motor, a power cord being electrically coupled to said motor;

a pair of mixing attachments, each of said mixing attachments including a male end being extendable into and removably couplable to one of said attachment couplers;

a compartment being positioned in said housing and extending into said perimeter wall, said compartment having a size configured to received said mixing attachments, said compartment extending upwardly into said bottom wall and having an open bottom end; and wherein said mixing attachments are pivotally coupled to said housing such that said mixing attachments are selectively pivotable into and out of said compartment through said open bottom end.

2. The apparatus according to claim 1, further including a door being hingedly coupled to said housing, said door being selectively positioned in a closed position closing said compartment.

3. A food mixer and attachment storage apparatus, said apparatus comprising:

a food mixer including a housing being defined by a perimeter wall, said perimeter wall including a top wall, a bottom wall and peripheral wall being attached to and extending between said top and bottom walls, a motor being mounted within said housing, a pair of attachment couplers being mounted in said bottom wall and being mechanically coupled to said motor, a power cord being electrically coupled to said motor, said power cord being retractable into said housing;

a pair of mixing attachments, each of said mixing attachments including a male end being extendable into and removably couplable to one of said attachment couplers;

a compartment being positioned in said housing and extending into said perimeter wall, said compartment having a size configured to received said mixing attachments;

a door being hingedly coupled to said housing, said door being selectively positioned in a closed position closing said compartment; and said compartment extending upwardly into said bottom wall and having an open bottom end, said mixing attachments being pivotally coupled to said housing such that said mixing attachments are selectively pivotable into and out of said compartment through said open bottom end.

4. The apparatus according to claim 1, further including said power cord being retractable into said housing.

* * * * *